(12) United States Patent
Wei et al.

(10) Patent No.: US 11,910,440 B1
(45) Date of Patent: Feb. 20, 2024

(54) METHOD AND APPARATUS FOR COMMUNICATION, ELECTRONIC DEVICE, AND STORAGE MEDIUM

(71) Applicant: NATIONAL UNIVERSITY OF DEFENSE TECHNOLOGY, Hunan (CN)

(72) Inventors: Jibo Wei, Hunan (CN); Fanglin Gu, Hunan (CN); Haitao Zhao, Hunan (CN); Jie Liu, Hunan (CN); Xiaoran Liu, Hunan (CN); Jun Xiong, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 0 days.

(21) Appl. No.: 18/132,000

(22) Filed: Apr. 7, 2023

(30) Foreign Application Priority Data

Oct. 20, 2022 (CN) .......................... 202211283178.2

(51) Int. Cl.
  *H04W 74/08* (2009.01)
  *H04L 5/00* (2006.01)
  (Continued)

(52) U.S. Cl.
  CPC ......... *H04W 74/0816* (2013.01); *G01S 7/415* (2013.01); *G01S 13/56* (2013.01); *H04L 5/0053* (2013.01)

(58) Field of Classification Search
  CPC .... G01S 7/415; G01S 13/56; H04W 74/0816; H04L 5/0053
  See application file for complete search history.

(56) References Cited

U.S. PATENT DOCUMENTS 10,868,867 B2 * 12/2020 Binder .................... H04L 67/12
11,500,058 B2 * 11/2022 Hu ......................... G01S 13/003
(Continued)

FOREIGN PATENT DOCUMENTS

CN  103596184 A  2/2014
CN  105656988 A  6/2016
(Continued)

OTHER PUBLICATIONS

Zhang Tuo, Research on Frequency Adaptive Selection Method in TDMA Frequency Hopping System, Modern Navigation, Feb. 2020 Issue 1.

*Primary Examiner* — Raj Jain
(74) *Attorney, Agent, or Firm* — Yue (Robert) Xu; Apex Attorneys at Law, LLP

(57) ABSTRACT

Disclosed are a method for communication, an electronic device, and a computer-readable storage medium. The method includes: determining a first target frequency based on historical sensed information of a destination node; transmitting an RTS frame to the destination node at the first target frequency, where the destination node obtains first sensed information of the source node from the RTS frame, and determines a first optimal receiving frequency of the source node based on the first sensed information; receiving a CTS frame transmitted by the destination node at the first optimal receiving frequency; obtaining second sensed information of the destination node from the CTS frame; determining a second optimal receiving frequency of the destination node based on the second sensed information; transmitting a data frame to the destination node at the second optimal receiving frequency; and receiving an ACK frame transmitted by the destination node at the first optimal receiving frequency.

16 Claims, 12 Drawing Sheets

(51) Int. Cl.
    *G01S 7/41*        (2006.01)
    *G01S 13/56*      (2006.01)

(56)           References Cited

U.S. PATENT DOCUMENTS

| | | | |
|---|---|---|---|
| 11,639,981 B2* | 5/2023 | Wu | H04W 4/021 |
| | | | 342/28 |
| 2015/0327292 A1* | 11/2015 | Morioka | H04W 72/02 |
| | | | 370/329 |
| 2016/0156723 A1 | 6/2016 | Seo et al. | |
| 2017/0238286 A1* | 8/2017 | Chun | H04W 72/21 |
| | | | 370/329 |
| 2017/0353958 A1 | 12/2017 | Long et al. | |
| 2021/0045094 A1 | 2/2021 | Zhang et al. | |
| 2021/0045111 A1 | 2/2021 | Zhang et al. | |
| 2021/0160037 A1 | 5/2021 | Ji | |
| 2022/0345936 A1* | 10/2022 | Dong | H04W 74/0816 |

FOREIGN PATENT DOCUMENTS

| | | | |
|---|---|---|---|
| CN | 105993162 A | 10/2016 | |
| CN | 106912110 A | 6/2017 | |
| CN | 107113624 A | 8/2017 | |
| CN | 109547348 A | 3/2019 | |
| CN | 110351795 A | 10/2019 | |
| CN | 110635882 A | 12/2019 | |
| CN | 110808818 A | 2/2020 | |
| CN | 112436917 A | 3/2021 | |
| CN | 112637917 A | 4/2021 | |
| CN | 113872713 A | 12/2021 | |
| CN | 114513817 A | 5/2022 | |
| CN | 114585031 A | 6/2022 | |

\* cited by examiner

| Frequency-selective head | PHY head | MAC head | Sensed information of a source node | CRC |

Figure 7

| Frequency-selective head | PHY head | MAC head | Sensed information of a destination node | CRC |

Figure 8

| Frequency-selective head | PHY head | MAC head | DATA | CRC |

Figure 9

| Frequency-selective head | PHY head | MAC head | Answered sequence number | CRC |

Figure 10

METHOD AND APPARATUS FOR COMMUNICATION, ELECTRONIC DEVICE, AND STORAGE MEDIUM

This application claims priority to Chinese application No. 202211283178.2, titled "METHOD AND APPARATUS FOR COMMUNICATION, ELECTRONIC DEVICE, AND STORAGE MEDIUM", filed on Oct. 20, 2022 with the China National Intellectual Property Administration, which is incorporated herein by reference in its entirety.

FIELD

The present disclosure relates to the field of communication technology, and in particular to a method and an apparatus for communication, an electronic device, and a computer-readable storage medium.

BACKGROUND

With the development of wireless communication technology and the widespread use of radio devices, an electromagnetic environment becomes more and more complex. How to improve reliability of wireless communication in a complex electromagnetic environment becomes a severe challenge that people is interested in. Frequency hopping and frequency spreading are effective methods for improving the reliability of a wireless communication system in the complex electromagnetic environment. However, the frequency hopping achieves only a statistical improvement, and cannot satisfy application requirements of a multi-process interactive networking. The frequency spreading has low spectrum utilization, and cannot meet heavy demands of frequencies.

A wireless autonomous frequency-selective system is an effective solution to achieve reliable transmission networking of a wireless communication system in a complex environment. In the system, communication nodes in the network, based on a real-time sensed electromagnetic interference environment, can communicate autonomously at any frequency based on a frequency hopping pattern of a frequency-hopping network or a frequency selection decision of a cognitive radio network, so as to achieve reliable communication between the nodes. Conventional researches on the autonomous frequency selection systems mainly focus on how to select a frequency and perform ad-hoc frequency-selective communication. As the autonomous frequency-selective system is widely applied in a multi-hop wireless network, support to and guarantee of a networking transmission function becomes important in network applications of the autonomous frequency selection system. To guarantee the networking transmission of the autonomous frequency-selective system in the multi-hop wireless communication environment, dynamic access control is implemented on nodes requesting access to the autonomous frequency-selective network. In the system, dynamic control is implemented on nodes to achieve a maximum utilization of network resources for communication, while ensuring that a receiving node and a transmitting node access the network at the same frequency, based on a model of frequency conflict in a two-hop range of a multi-hop wireless environment, where signal conflict occurs when data transmission at a same frequency in the two-hop range.

In conventional technology, there are two dynamic access control methods for an autonomous frequency selection system depending on architectures thereof, i.e., a centralized access control method and a distributed access control method. In the centralized access control method, all secondary nodes in a network are controlled by a central node in a unified manner. Strict time synchronization between a primary node and a secondary node is implemented. The secondary nodes transmit all request information back to the central node, and the central node transmits control information to the respective nodes. Therefore, a great overhead for control is caused. In addition, a flexibility and invulnerability of the networking is degraded due to un-equivalence in importance of the central node. In the distributed access control method, unified control by a unified primary node is avoided, and each node autonomously selects a frequency for access and negotiates with another node about channel occupancy. Therefore, the distributed access control method is more flexible and more suitable for a wireless network environment. The distributed autonomous frequency-selective system in an actual wireless multi-hop network faces a challenge that a destination node cannot know an operating frequency determined by a source node, or the destination node cannot receive normally at the operating frequency determined by the source node, or the like, in a case that the destination node cannot feedback current interference information at the destination node to a source node timely and accurately. In a broadcast mode, the source node communicates with multiple destination nodes, and the source node makes a decision based on a collection of feedback information from the multiple destination nodes. Therefore, a decision result (operating frequency) is unknown to each of the destination nodes.

Therefore, how to efficiently and reliably establish a connection between the source node and the destination node under a condition that an operating frequency of the source node and an operating frequency of the destination node are determined but unknown to each other is attracting the attention of those skilled in the art.

SUMMARY

An objective of the present disclosure is to provide a method and an apparatus for communication, an electronic device, and a computer-readable storage medium, with which a connection between a source node and a destination node can be established efficiently and reliably under a condition that an operating frequency of the source node and an operating frequency of the destination node are determined but unknown to each other.

To achieve the above objective, a method for communication applied to a source node is provided according to an embodiment of the present disclosure. The method includes: determining a first target frequency based on historical sensed information of a destination node, and transmitting a request-to-send (RTS) frame to the destination node at the first target frequency, where the destination node obtains first sensed information of the source node based on the RTS frame, and determines a first optimal receiving frequency of the source node based on the first sensed information; receiving a clear-to-send (CTS) frame transmitted by the destination node at the first optimal receiving frequency, obtaining second sensed information of the destination node based on the CTS frame, and determining a second optimal receiving frequency of the destination node based on the second sensed information; and transmitting a data frame to the destination node at the second optimal receiving frequency, and receiving an acknowledge (ACK) frame transmitted by the destination node at the first optimal receiving frequency.

In an embodiment, the determining a first target frequency based on historical sensed information of a destination node includes: determining whether the historical sensed information of the destination node exists; determining the first target frequency based on the historical sensed information of the destination node, in a case that the historical sensed information of the destination node exists; and determining the first target frequency based on sensed information of a neighboring node within a single-hop network, in a case that the historical sensed information of the destination node does not exist.

In an embodiment, the determining a second optimal receiving frequency of the destination node based on the second sensed information includes: determining a channel quality of each channel corresponding to a frequency based on the second sensed information; and determining a frequency corresponding to a channel whose channel quality is highest and greater than a predetermined value as the second optimal receiving frequency of the destination node.

In an embodiment, the determining a second optimal receiving frequency of the destination node based on the second sensed information includes: determining the second optimal receiving frequency of the destination node based on the second sensed information and sensed information of a neighboring node within a single-hop network.

In an embodiment, the receiving a CTS frame transmitted by the destination node at the first optimal receiving frequency includes: receiving, through frequency hopping, a frequency-selective header transmitted by the destination node; determining the first optimal receiving frequency through frequency-selective header synchronization; and switching a receiving frequency to the first optimal receiving frequency, to receive the CTS frame transmitted by the destination node at the first optimal receiving frequency.

In an embodiment, the frequency-selective header includes a 2×N-hop frame structure for the first optimal receiving frequency, where N represents a quantity of candidate frequencies, and a single-hop frame structure includes a wash sequence. The receiving, through frequency hopping, a frequency-selective header transmitted by the destination node includes: switching the receiving frequency among the candidate frequencies in a predetermined manner, to receive the frequency-selective header transmitted by the destination node; where for each of the candidate frequencies, the receiving frequency is switched to the candidate frequency and remained for a target time period, and the target time period is twice of a time period of a single hop in the frequency-selective header. The determining the first optimal receiving frequency through frequency-selective header synchronization includes: calculating a correlation between a received wash sequence in a single-hop frame structure corresponding to a candidate frequency and a local wash sequence; and determining a candidate frequency corresponding to a correlation which is greater than a predetermined value as the first optimal receiving frequency.

In an embodiment, before the determining a first target frequency based on historical sensed information of a destination node, the method further includes: determining whether a channel is idle through physical carrier sensing and virtual carrier sensing, on determining of presence of data to be transmitted to the destination node; and contending for the channel through a random back-off in a case that the channel is idle, where the method proceeds to the determining a first target frequency based on historical sensed information of a destination node after the channel is obtained.

To achieve the above objective, an apparatus for communication, applied to a source node, is provided according to an embodiment of the present disclosure. The apparatus includes: a first transmitting module, configured to determine a first target frequency based on historical sensed information of a destination node, and transmit a request-to-send (RTS) frame to the destination node at the first target frequency, where the destination node obtains first sensed information of the source node based on the RTS frame, and determines a first optimal receiving frequency of the source node based on the first sensed information; a first receiving module, configured to receive a clear-to-send (CTS) frame transmitted by the destination node at the first optimal receiving frequency; a determination module is configured to obtain second sensed information of the destination node based on the CTS frame, and determine a second optimal receiving frequency of the destination node based on the second sensed information; a second transmitting module, configured to transmit a data frame to the destination node at the second optimal receiving frequency; and a second receiving module, configured to receive an acknowledge (ACK) frame transmitted by the destination node at the first optimal receiving frequency.

To achieve the above objective, an electronic device is provided according to an embodiment of the present disclosure. The electronic device includes: a memory storing a computer program; and a processor, configured to perform, when executing the computer program, the method for communication as above.

To achieve the above objective, a computer-readable storage medium is provided according to an embodiment of the present disclosure. The computer-readable storage medium stores a computer program. The computer program, when executed by a processor, configures the processor to perform the method for communication as above.

Based on the above technical solutions, the method for communication provided in the embodiments of the present disclosure includes: determining a first target frequency based on historical sensed information of a destination node, and transmitting a request-to-send (RTS) frame to the destination node at the first target frequency, where the destination node obtains first sensed information of the source node based on the RTS frame, and determines a first optimal receiving frequency of the source node based on the first sensed information; receiving a clear-to-send (CTS) frame transmitted by the destination node at the first optimal receiving frequency, obtaining second sensed information of the destination node based on the CTS frame, and determining a second optimal receiving frequency of the destination node based on the second sensed information; and transmitting a data frame to the destination node at the second optimal receiving frequency, and receiving an acknowledge (ACK) frame transmitted by the destination node at the first optimal receiving frequency.

In the method according to the embodiments of the present disclosure, the source node determines, based on the sensed information of the destination node, an optimal receiving frequency (i.e., the second receiving frequency) of the destination node. The destination node determines, based on the sensed information of the source node, an optimal receiving frequency (i.e., the first receiving frequency) of the source node. The sensed information includes sensed channel qualities of channels corresponding to frequencies. An optimal operating frequency may be determined based on the sensed information. In subsequent communications, the source node transmits frames to the destination node all at the second optimal receiving frequency, and the destination node transmits frames all at the first optimal receiving frequency. As can be seen, with the method according to the embodiments of the present disclosure, a connection between the source node and the destination node can be established efficiently and reliably under a condition that the operating frequency of the source node and the operating frequency of the destination node are determined but unknown to each other. Thereby, network resources are controlled so that a utilization of the resources is improved while ensuring fairness. An apparatus for communication, an electronic device, and a computer-readable storage medium are further provided according to embodiments of the present disclosure, which can achieve the above technical effects.

It should be understood that the above general description and the following detailed description are only exemplary and do not limit the present disclosure.

BRIEF DESCRIPTION OF THE DRAWINGS

In order to more clearly illustrate the technical solutions in the embodiments according to the present disclosure or in the conventional technology, the accompanying drawings used in the description of the embodiments or the conventional technology are briefly described hereinafter. Apparently, the accompanying drawings in the following description are only some embodiments of the present disclosure. Other accompanying drawings may be obtained by those skilled in the art from these accompanying drawings, without any creative effort. The accompanying drawings are intended to provide a further understanding of the present disclosure and form a part of the specification, and are used to explain the present disclosure together with the following specific embodiments, but do not limit the present disclosure. In the accompanying drawings:

FIG. 7 shows a schematic diagram illustrating a frame structure of an RTS frame according to an exemplary embodiment;

FIG. 8 shows a schematic diagram illustrating a frame structure of a CTS frame according to an exemplary embodiment;

FIG. 9 shows a schematic diagram illustrating a frame structure of a DATA frame according to an exemplary embodiment;

FIG. 10 shows a schematic diagram illustrating a frame structure of an ACK frame according to an exemplary embodiment;

DETAILED DESCRIPTION OF THE EMBODIMENTS

The technical solutions in the embodiments of the present disclosure are clearly and completely described hereinafter in connection with the accompanying drawings in the embodiments of the present disclosure. Apparently, the described embodiments are only a part of, rather than all, the embodiments of the present disclosure. All other embodiments obtained by those of ordinary skills in the art from the embodiments of the present disclosure without any creative effort fall within the protection scope of the present disclosure. Furthermore, "first", "second", or the like, are used in the embodiments to distinguish among similar objects and are not necessarily describe a particular order or sequence.

Figure 1:
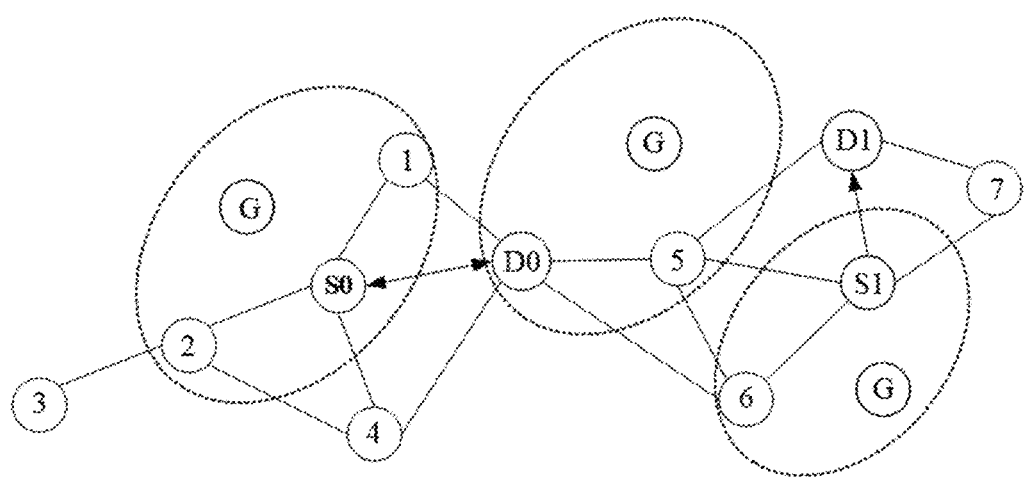
FIG. 1 shows a topology diagram of a distributed frequency-selective communication system according to an exemplary embodiment.

A distributed frequency-selective communication system is applied to a distributed self-organizing network. A typical application topology of the distributed frequency-selective communication system is as shown in FIG. 1. In FIG. 1, G represents an interference source, S0 and D0 represents a pair of communication nodes, S1 and D1 presents a pair of communication nodes, 1, 2, 3, 4, 5, 6 and 7 represents other nodes, and an areas with a dotted boundary represents an interference range. Interference sources in FIG. 1 may have different interference patterns, interference frequencies, and other parameters. Therefore, interferences at different nodes may have different interference patterns and frequencies. A core idea of the distributed frequency-selective communication system is that each node senses a surrounding interference in real time, and a pair of communication nodes makes a distributed decision on an optimal frequency for communication between the pair of communication nodes based on an interference sensed by a receiver, so as to avoid a frequency band of the interference and achieve a stable and reliable communication between the pair of communication nodes. FIG. 1 shows a frequency selection in the network when there is communication between S0 and D0 and communication between S1 and D1. As can be seen, each of the nodes serves as both a transmitter and a receiver during a networking communication. The decision of frequency selection is based on the interference at the receiver, and each node selects, according to a certain principle, an optimal operating frequency at which the node is subject to a least interference when serving as a receiver. Based on the above analysis, a great challenge in realizing the distributed frequency selection is: how to achieve frequency alignment between the transmitter and the receiver with a low link overhead and a low time-delay, and thereby complete a normal communication, in a case that an operating frequency of the transmitter and an operating frequency of the receiver are unknown to each other.

A distributed frequency-selection networking protocol is designed based on a CSMA (Carrier Sense Multiple Access) protocol. A main feature in networking is that an overall communication mechanism of the network is to perform transceiving control based on the CSMA protocol in terms of time, and perform frequency-selective communication through autonomous frequency selection for interference immunity in terms of frequency. A set of operating frequencies of the nodes is represented as {f0, f1, f2, ..., fm}. The transmitter and the receiver perform frequency-selective synchronization in a blind convergence manner. The transmitter selects a transmitting frequency based on sensed information from the receiver. The receiver parses a frequency-selective synchronization header of a received frame to determine a frequency of current data, and receives data at the determined frequency. The transmitter, when broadcasts, transmits data at a transmitting frequency selected based on sensed information from a neighboring node in a one-hop range. When the transmitter transmits a frame, any neighboring node which is within the one-hop range of the transmitter and ready to receive data at a frequency is able to sense the frame.

A method for communication is provided according to an embodiment of the present disclosure, with which a connection between a source node and a destination node can be established efficiently and reliably under a condition that an operating frequency of the source node and an operating frequency of the destination node are determined but unknown to each other.

Figure 2:
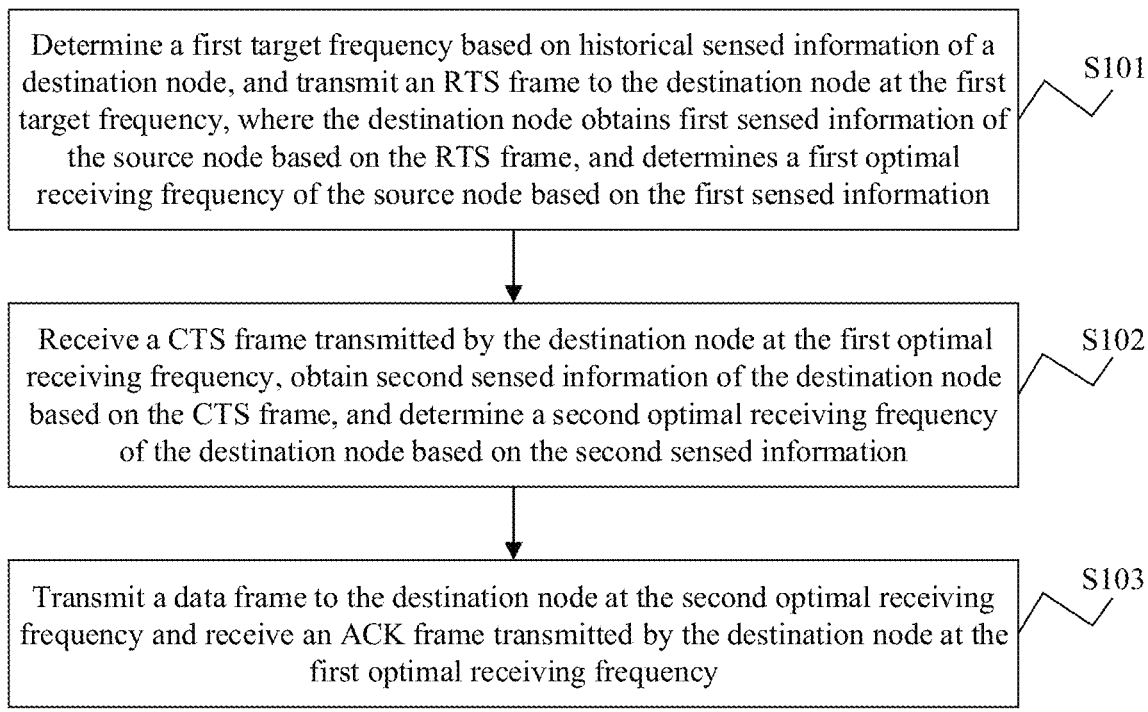
FIG. 2 shows a flowchart of a method for communication according to an exemplary embodiment.

Reference is made to FIG. 2, which is a flowchart of a method for communication according to an exemplary embodiment. As shown in FIG. 2, the method includes steps S101 to S103.

In step S101, a first target frequency is determined based on historical sensed information of a destination node, and an RTS frame is transmitted to the destination node at the first target frequency, where the destination node obtains first sensed information of the source node based on the RTS frame, and determines a first optimal receiving frequency of the source node based on the first sensed information.

The embodiment is applied to the source node. On determining of presence of data to be transmitted to the destination node, the source node determines whether a channel is idle through physical carrier sensing and virtual carrier sensing. In a case that the channel is idle, the source node contends for the channel through a random back-off. After the channel is obtained, the method proceeds to the step of determining the first target frequency based on the historical sensed information of the destination node.

The physical carrier sensing occurs when an NAV (Network Allocation Vector) has a value of 0 and there is data being transmitted, and is used to sense and determine whether there is another node transmitting data through the channel, so as to determine whether a channel is busy or idle. A sensing process is performed as follows. Before transmitting a data frame, a channel is first detected. A frequency switching is performed among N frequencies. It is determined that there is a node transmitting data through the channel, in a case that a frequency-selective header is detected. The physical carrier sensing is terminated in a case that an idle time period is greater than a single DIFS (Distributed Inter-frame Spacing) time period. In a case that the channel is detected busy, the DIFS time period is cleared and a counting is started again when the channel become idle.

In a specific implementation, a frequency-selective header is sensed to determine whether a data signal is being transmitted or transmitted. Since a network node may have any receiving frequency, it is possible, (which is a worst case), that a time instant of success of the frequency-selective synchronization is at a last position of the frequency-selective synchronization header. Therefore, a SIFS (short inter-frame spacing) for the physical carrier sensing is required to be set equal to an overall time period of the frequency-selective synchronization header. That is, whether the channel is idle or busy is determined by determining whether the channel is idle at a time instant at least a DIFS after the channel is first detected idle.

Any node that is to transmit a data frame is required to go through a back-off process after a medium remains idle for a DIFS or after the medium fails to receive a frame correctly within an EIFS (extended inter-frame spacing). A time period of the back-off process is determined through a random back-off algorithm. The time period is calculated as:

BackoffTime=Random( )×aSlotTime.

In the equation, BackoffTime represents the time period of the back-off; Random( ) represents a pseudo-random integer uniformly distributed in a range of [0, CW], where CW (Contention window) refers to a value between a CWmin (a minimum contention window) and a CWmax (maximum contention window), which are feature values of a physical layer, and a size of the contention window may be specified based on inconsistency of a QoS (Quality of Service) level, so as to increase or decrease an access probability; and aSlotTime represents a time period of a time slot, where a magnitude of the aSlotTime depends on the physical layer. For example, in the i-th back-off, a value is randomly selected from 2i time slots as a value for the back-off of the node.

After the node enters the back-off process, a value obtained through the random back-off algorithm is firstly written into a back-off timer. Then, it is determined, by using the carrier sensing mechanism, whether the medium is idle in a back-off time slot. In a case that the medium remains idle in a certain back-off time slot, the value in the back-off timer is reduced by one time period of a time slot (that is, the aSlotTime) in the back-off process. In a case that the medium becomes busy during a back-off time slot, the back-off process is suspended and the back-off timer does not count this time slot. The back-off process restarts in a case that the medium remains idle for a DIFS or the medium fails to receive a frame correctly within an EIFS again. An RTS frame is transmitted only in a case that the back-off timer has a value of 0.

The virtual carrier sensing mechanism is established based on NAV, which is a value indicating a remaining time period in which the channel is idle. For each node, the NAV is kept to be a latest value by taking a time value from a MAC (Media Access Control) frame transmitted by the channel. A busy/idle state of the channel of a MAC layer is determined through both the physical carrier sensing and the virtual carrier sensing. The channel is determined to be idle in a case that both the physical carrier sensing and the virtual carrier sensing indicate that the channel is idle. Otherwise, the MAC layer determines that the channel is busy, even if the physical carrier sensing indicates that the medium is idle and the NAV is not yet changed to 0. The node transmits data only in a case that a CSMA/CA (Carrier Sense Multiple Access with Collision avoidance) carrier sensing detects that the channel is idle; and otherwise, the node continues waiting.

A complete process of the virtual carrier sensing is described below. At an initial transmitting time where NAV is 0, the node senses for a time period of a DIFS. The node enters the random back-off process in a case that the channel is idle, and determines whether the channel is idle and then transmits an RTS frame. A destination node replies with a CTS frame in receiving of the RTS frame, and a node other than the destination node updates the NAV value in receiving the RTS frame. The source node performs the physical carrier sensing again, in a case that the source node fails to receive the CTS frame before timeout. The source node transmits a DATA frame, in a case that the source node receives the CTS frame before timeout. A node other than the source node updates the NAV value in receiving the CTS frame. The destination node replies with an ACK frame in receiving the DATA frame, and a node other than the destination node updates the NAV value in receiving the DATA frame. In a case that the source node fails to receive the ACK frame before timeout, the source node performs the physical carrier sensing again, entering a retransmission process. A node other than the source node updates the NAV value in receiving the ACK frame.

After the channel is obtained, the source node obtains historical sensed information of the destination node. The historical sensed information includes a channel quality of each channel corresponding to a frequency sensed historically by the destination node. The source node determines an optimal operating frequency, i.e. a first target frequency, based on the historical sensed information of the destination node. In a specific implementation, the channel qualities of the channels corresponding to the frequencies may be normalized to values in a range of [0, 1], and a channel quality threshold T corresponding to good channel communication is obtained through multiple experiments. An operating frequency corresponding to a channel whose channel quality is highest and greater than T is determined as the first target frequency.

As a feasible embodiment, the determining a first target frequency based on historical sensed information of a destination node includes: determining whether the historical sensed information of the destination node exists; determining the first target frequency based on the historical sensed information of the destination node, in a case that the historical sensed information of the destination node exists; and determining the first target frequency based on sensed information of a neighboring node within a single-hop network, in a case that the historical sensed information of the destination node does not exist. In a specific implementation, the optimal operating frequency, i.e. the first target frequency, is determined based on the sensed information of the neighboring node in the single-hop network, in a case that the historical sensed information of the destination node does not exist in the source node.

Further, an RTS frame is transmitted to the destination node at the first target frequency, and the destination node obtains first sensed information of the source node based on the RTS frame. The first sensed information includes a channel quality of each channel corresponding to a frequency sensed by the source node. The destination node may determine a first optimal receiving frequency of the source node based on the first sensed information. A method by which the destination node determines the optimal frequency based on the sensed information is similar to the method by which the source node determines the optimal frequency based on the sensed information as described above, and is not repeated here. The destination node replies to the RTS frame by transmitting a CTS frame to the source node at the first optimal receiving frequency.

In step S102, a CTS frame transmitted by the destination node at the first optimal receiving frequency is received, second sensed information of the destination node is obtained based on the CTS frame, and a second optimal receiving frequency of the destination node is determined based on the second sensed information.

In step S102, the source node receives the CTS frame transmitted by the destination node at the first optimal receiving frequency, and the source node obtains the second sensed information of the destination node based on the CTS frame. The second sensed information includes a channel quality of each channel corresponding to a frequency sensed by the destination node at present. The source node can determine the second optimal receiving frequency of the destination node based on the second sensed information.

As a feasible embodiment, the determining a second optimal receiving frequency of the destination node based on the second sensed information includes: determining a channel quality of each channel corresponding to a frequency based on the second sensed information; and determining a frequency corresponding to a channel whose channel quality is highest and greater than a predetermined value as the second optimal receiving frequency of the destination node.

In a preferred embodiment, the determining a second optimal receiving frequency of the destination node based on the second sensed information includes: determining the second optimal receiving frequency of the destination node based on the second sensed information and sensed information of a neighboring node within a single-hop network. In a specific implementation, the source node may determine the second optimal receiving frequency of the destination node based on both the second sensed information of the destination node and the sensed information of the neighboring node within the single-hop network.

In some embodiments, a blind convergence process of synchronizing a transmitting frequency and a receiving frequency in a case that the frequency of the receiver is unknown is performed by means of a frequency-selective synchronization header. As a preferred embodiment, the receiving a CTS frame transmitted by the destination node at the first optimal receiving frequency includes: receiving, through frequency hopping, a frequency-selective header transmitted by the destination node; determining the first optimal receiving frequency through frequency-selective header synchronization; and switching a receiving frequency to the first optimal receiving frequency, to receive the CTS frame transmitted by the destination node at the first optimal receiving frequency.

It is noted that the frequency-selective header appears prior to all transmitted frames. Here, a transmitted frame is either a transmitted frame transmitted from the source node to the destination node, or a transmitted frame transmitted from the destination node to the source node, including but not limited to the above-mentioned RTS frame, the CTS frame, and subsequent data frame (DATA frame), ACK frame.

Figure 3:
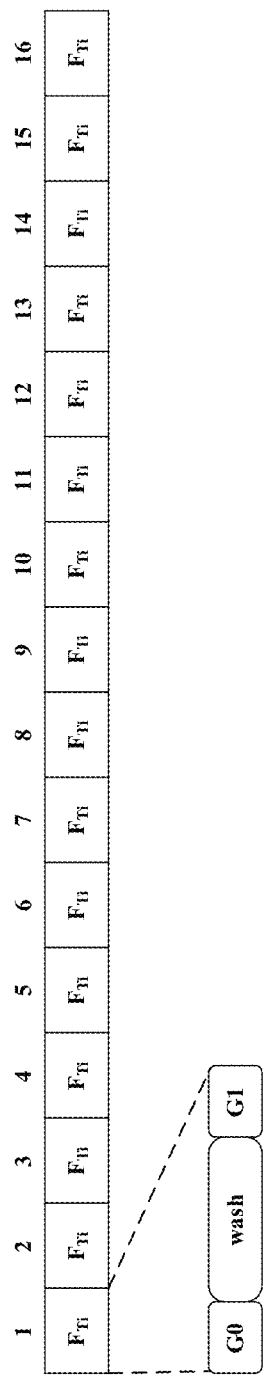
FIG. 3 shows a schematic structural diagram of a frequency-selective header according to an exemplary embodiment.
Figure 4:
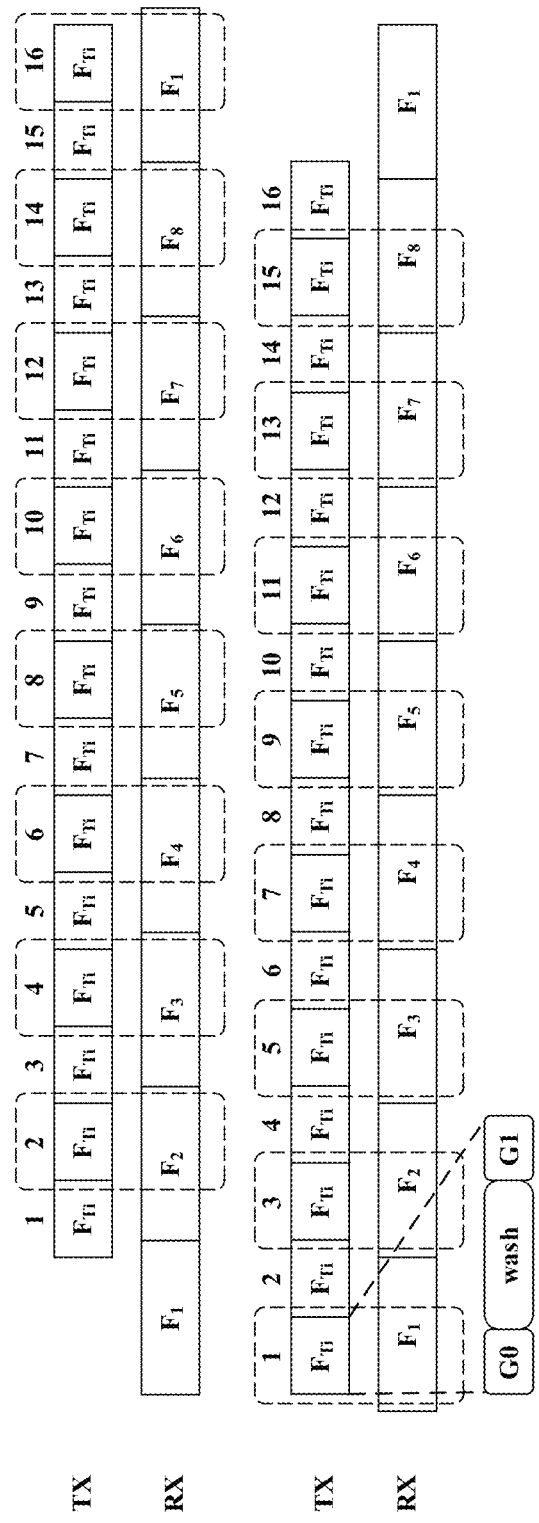
FIG. 4 shows a schematic diagram of a process of frequency-selective synchronization according to an exemplary embodiment.

The frequency-selective header includes a 2×N-hop frame structure for the first optimal receiving frequency, where N represents a quantity of candidate frequencies, and a single-hop frame structure includes a wash sequence. The frequency-selective header is as shown in FIG. 3, and a process of frequency-selective header synchronization is shown in FIG. 4. At the transmitter, the frame structure of each frequency-selective header has a duration of 2×N (N represents the quantity of frequency-selective bands) hops. The frequency-selective synchronization header is transmitted at a decided frequency $F_{Ti}$ for 2×N times. Each hop in the frequency-selective header consists of a wash sequence, a time period for frequency switching prior to the wash sequence, and a time period for frequency switching subsequent to the wash sequence.

The receiving, through frequency hopping, a frequency-selective header transmitted by the destination node includes: switching the receiving frequency among the candidate frequencies in a predetermined manner, to receive the frequency-selective header transmitted by the destination node; where for each of the candidate frequencies, the receiving frequency is switched to the candidate frequency and remained for a target time period, and the target time period is twice of a time period of a single hop in the frequency-selective header. In a specific implementation, the receiver switches among frequency $F_1$ to frequency $F_N$ in a determined manner, and each of the frequencies is remained for twice the single-hop time period of the transmitter. Therefore, it is ensured that the receiver can receive one-hop data of the transmitter as the receiver switches to a frequency corresponding to the transmitter.

The determining the first optimal receiving frequency through frequency-selective header synchronization includes: calculating a correlation between a received wash sequence in a single-hop frame structure corresponding to a candidate frequency and a local wash sequence; and determining a candidate frequency corresponding to a correlation which is greater than a predetermined value as the first optimal receiving frequency. In a specific implementation, after the receiver receives a wash sequence at a corresponding frequency and the correlation of the wash sequence is greater than the predetermined value, the receiver determines that the frequency-selective synchronization succeeds, and switches to the corresponding receiving frequency for data frame synchronization. In a case that the receiver fails to perform frame synchronization within a predetermined time period after the frequency-selective synchronization, the receiver is reset to a state of polling for frequency-selective synchronization and switching among the frequencies for receiving data.

In step S103, a data frame is transmitted to the destination node at the second optimal receiving frequency, and an ACK frame transmitted by the destination node at the first optimal receiving frequency is received.

In step S103, the source node transmits the data frame to the destination node at the second optimal receiving frequency, and the destination node transmits the ACK frame at the first optimal receiving frequency. In subsequent communication, the source node transmits frames to the destination node all at the second optimal receiving frequency, and the destination node transmits frames all at the first optimal receiving frequency.

In the method for communication according to the embodiments of the present disclosure, the source node determines, based on the sensed information of the destination node, an optimal receiving frequency (i.e., the second receiving frequency) of the destination node. The destination node determines, based on the sensed information of the source node, an optimal receiving frequency (i.e., the first receiving frequency) of the source node. The sensed information includes a sensed channel quality of each channel corresponding to a frequency. An optimal operating frequency may be determined based on the sensed information. In subsequent communication, the source node transmits frames to the destination node all at the second optimal receiving frequency, and the destination node transmits frames all at the first optimal receiving frequency. As can be seen, with the method according to the embodiments of the present disclosure, a connection between the source node and the destination node can be established efficiently and reliably under a condition that the operating frequency of the source node and the operating frequency of the destination node are determined but unknown to each other. Thereby, network resources are controlled so that a utilization of the resources is improved while ensuring fairness.

Figure 5:
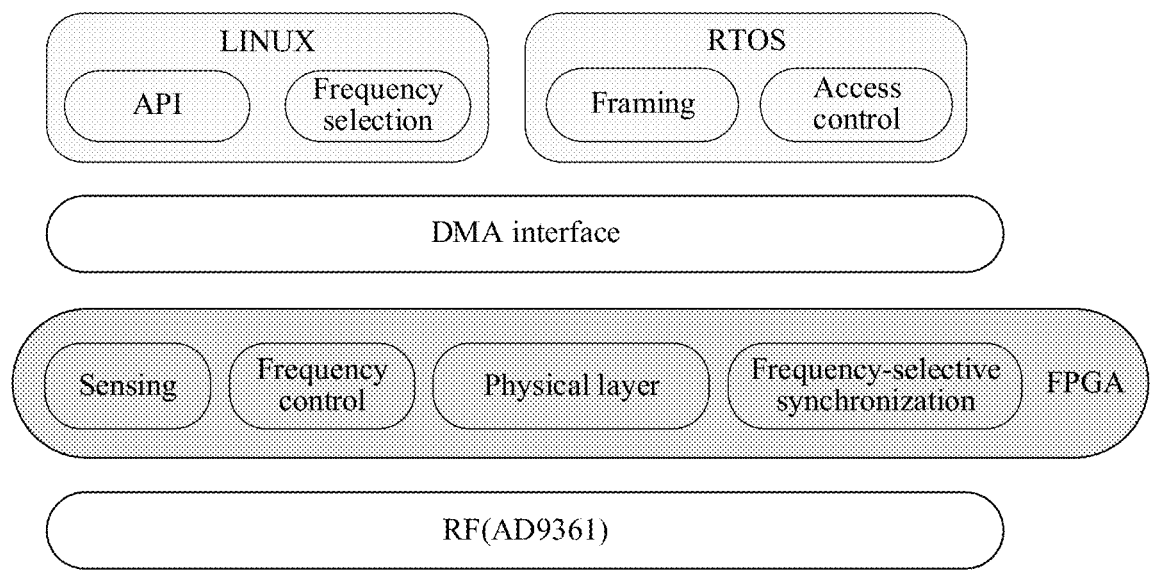
FIG. 5 shows a structural diagram of a distributed frequency-selective communication system according to an exemplary embodiment.

An application embodiment, a distributed frequency-selective communication system, provided in the present disclosure is described hereinafter. Compared with a traditional wireless self-organizing network waveform, a networking communication protocol of the distributed frequency-selective communication system is required to provide basic functions of frequency-selective sensing and distributed frequency-selective synchronization before nodes normally access a network. Further, it is required that an interfered frequency band is avoided through a frequency-selective decision function, so that a frequency band with an optimal channel quality is selected for self-organizing network communication, and thereby an anti-interference frequency-selective networking is achieved. A structural diagram of the distributed frequency-selective communication system is as shown in FIG. 5. The system includes a FPGA (Field Programmable Gate Array) side, a RTOS (Real Time Operating System) side, and an LINUX side. The FPGA is mainly configured for functions of sensing, frequency switching, coding and decoding, and modulation and demodulation. The RTOS side is mainly configured for function of media access control and framing. The LINUX side is mainly configured for receiving sensed data to make a frequency-selection decision, and providing an application interface.

A frequency selection decision module is configured to determine, based on channel information sensed by a single node or the network, an optimal frequency band for communication in the network. An access control module is configured to perform access control by using a distributed access control protocol CSMA. A framing module is configured to perform framing and transmit frames in a defined frame format, or extract useful information in receiving of the frames. A sensing module is configured to receive signals in frequency bands, and calculate energy levels of the signals. A frequency-selective synchronization module is configured to perform frequency-selective synchronization between a node in the network and a node accessing the network, and negotiate with a node in the network for frequency-selective synchronization in a case that the frequency selection decision changes. A physical layer is configured to perform modulation and demodulation function, and coding and decoding function of the distributed frequency-selective communication system.

Figure 6:
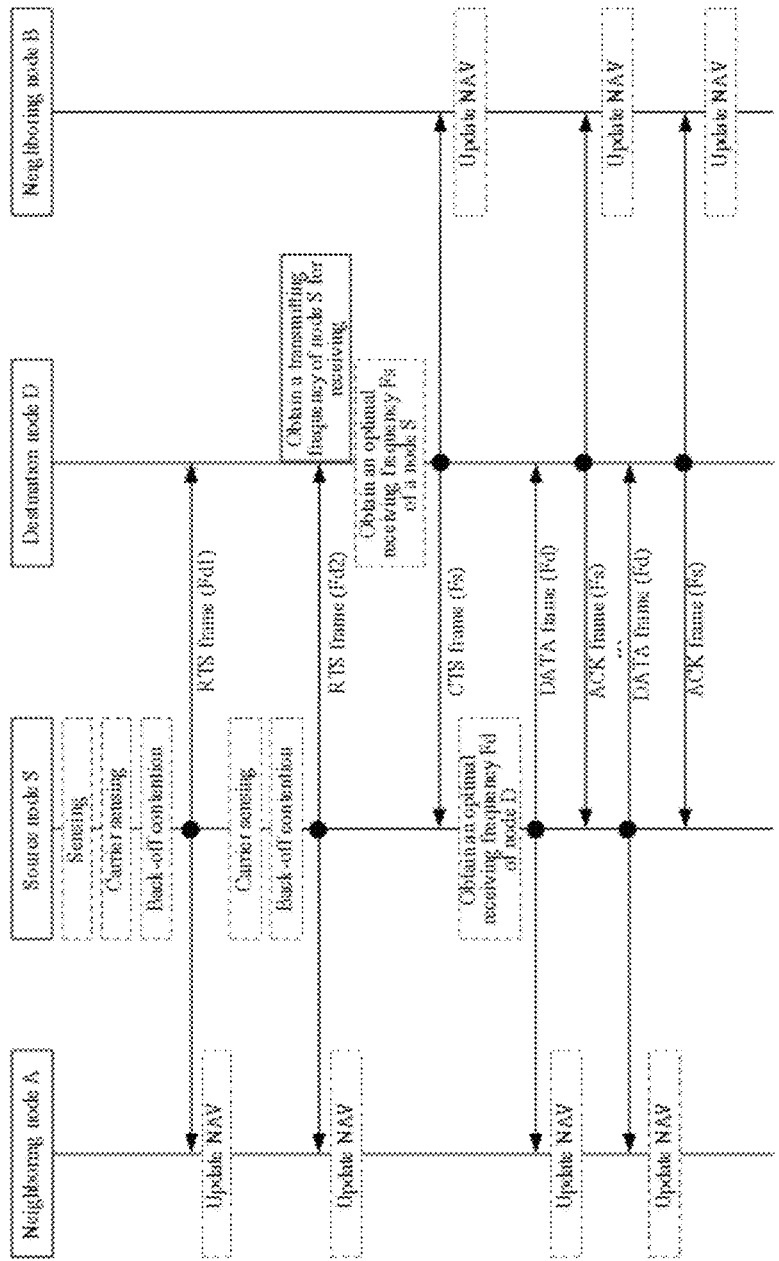
FIG. 6 shows a flow chart of a process of frame transmitting and receiving, and frequency-selective networking according to an exemplary embodiment.

The distributed frequency-selective networking protocol is designed based on the CSMA protocol. A process of transmitting and receiving frames and performing frequency-selective networking according to the protocol is as shown in FIG. 6. The process may include the following steps 1 to 8.

In step 1, after sensing a channel, a source node performs carrier sensing and channel contention in a case that there is data to be transmitted.

In step 2, after obtaining the channel, the source node transmits an RTS frame at an optimal frequency Fd1 of a destination node. In a case that the source node fails to obtain historical sensed information of the destination node, the optimal frequency Fd1 is determined based on sensed information of a neighboring node within a single-hop network.

In step 3, the source node determines a second optimal frequency Fd2 through carrier sensing and channel contention, and transmits at the second optimal frequency Fd2, in a case that the source node fails to receive a CTS frame before timeout.

In step 4, the destination node obtains a frequency-selective header of the source node through frequency hopping, obtains the transmitting frequency of the source node, receives data at the transmitting frequency of the source node, obtains sensed information of the source node by parsing data, and determines an optimal frequency Fs based on the sensed information of the source node and sensed information of a neighboring node within a single-hop network.

In step 5, the destination node transmits a CTS frame at the Fs, the source node obtains a frequency-selective header of the destination node through frequency hopping, obtains the transmitting frequency of the destination node, receives data at the transmitting frequency of the destination node, obtains sensed information of the destination node by parsing data, and determines an optimal frequency Fd based on sensed information of the destination node and sensed information of neighboring node within a single-hop network.

In step 6, the source node transmits a DATA frame at the Fd, and the destination node transmits an ACK frame at the Fs.

In step 7, each of other nodes updates an NAV value for virtual carrier sensing in receiving the RTS frame, the CTS frame, the DATA frame, or the ACK frame.

In step 8, each of the nodes obtains a frequency-selective header data through frequency hopping, and performs reception at the obtained frequency-selective header, and continues to obtain a frequency-selective header after the reception, or start transmission after the reception.

A frame structure of the RTS frame is as shown in FIG. 7. A frame structure of the CTS frame is as shown in FIG. 8. A frame structure of the DATA frame is as shown in FIG. 9. A frame structure of the ACK frame is as shown in FIG. 10.

In the present embodiment, a blind convergence of synchronizing a transmitting frequency and a receiving frequency in a case that the frequency of the receiver is unknown is performed by means of a frequency-selective synchronization header. The transmitter adds a sequence of 2N repetitions of the decided frequency FT, prior to a physical layer header of a transmitting frame. The receiver performs, during a receiving process, calculation for frequency-selective synchronization with switching of the frequency, that is, performs correlation calculation on a received wash sequence and a local wash sequence. In a case that a peak in the correlation calculation is greater than a certain value, it is determined that the synchronization is successful. Therefore, a signal for the frequency-selective synchronization is pulled up, and a current state x of frequency-selective switching is recorded. That is, frequency x is determined to be a frequency for the frequency-selective synchronization. A normal framing receiving is then performed at the frequency x.

Figure 11:
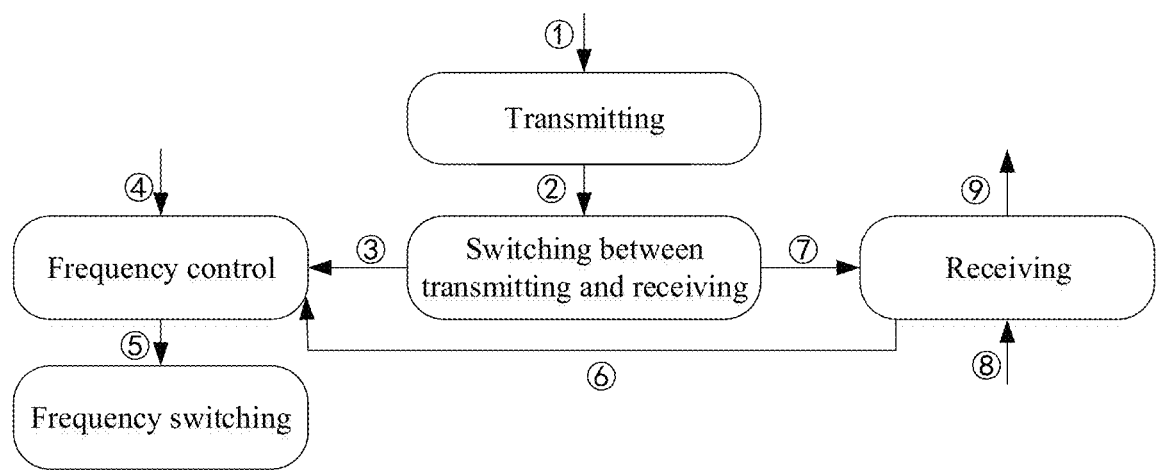
FIG. 11 shows a schematic diagram of a frequency switching process at a receiver and a transmitter according to an exemplary embodiment.
Figure 12:
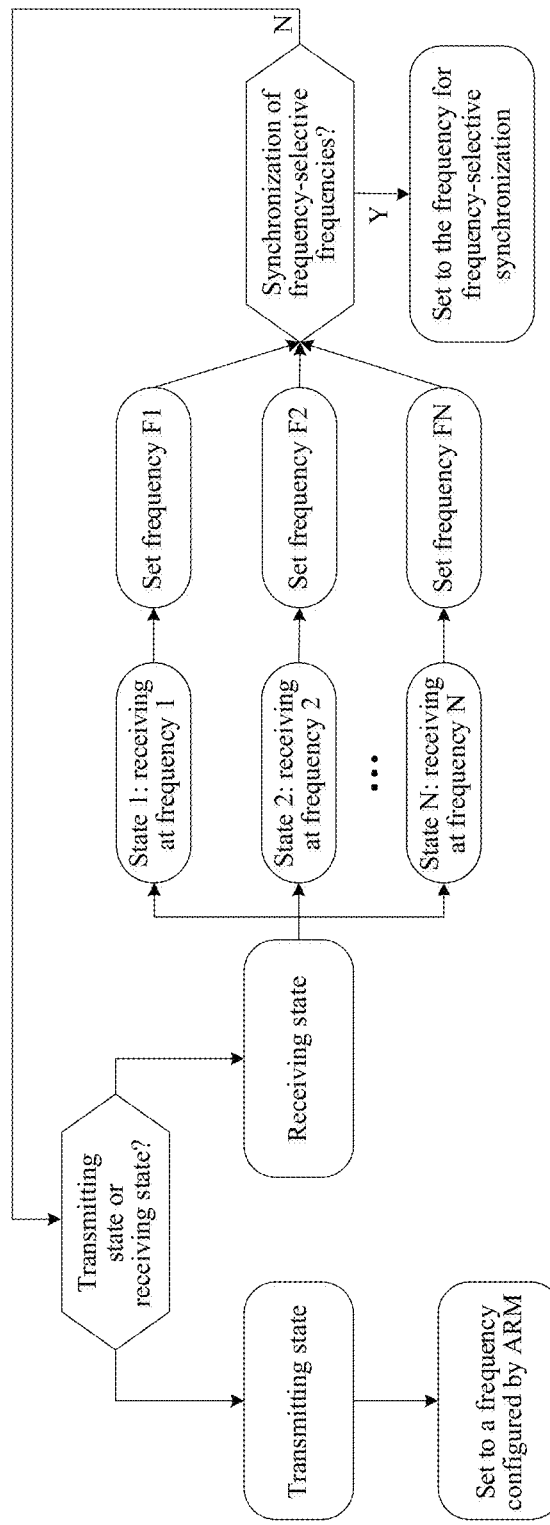
FIG. 12 shows a schematic diagram of a frequency control process according to an exemplary embodiment.

A frequency switching process for the receiver and the transmitter is as shown in FIG. 11. In FIG. 11, ① represents issue of a start signal, ② represents switching of a transmitting signal, ③ represents an indication of a receiving state or a transmitting state, ④ represents a frequency configured by an ARM (Advanced RISC Machine), ④ represents a frequency to be switched to, ⑥ represents a frequency obtained from parse on frequency-selective synchronization in the receiving state, ⑦ represents an indication of a receiving state or a transmitting state, ⑧ represents to-be-received data, ⑨ represents a frame synchronization signal of a frequency-selective synchronization signal. A process of frequency control is as shown in FIG. 12. In a case of the transmitting state, the frequency configured by the ARM is set. In a case of the receiving state, different frequencies are set according to different states. For example, state 1 indicates receiving at frequency 1, a frequency F1 is set; state 2 indicates receiving at frequency 2, a frequency F2 is set; and state N indicates receiving at frequency N, a frequency FN is set. The frequency of the frequency-selective synchronization is set after the frequency-selective synchronization.

Figure 13:
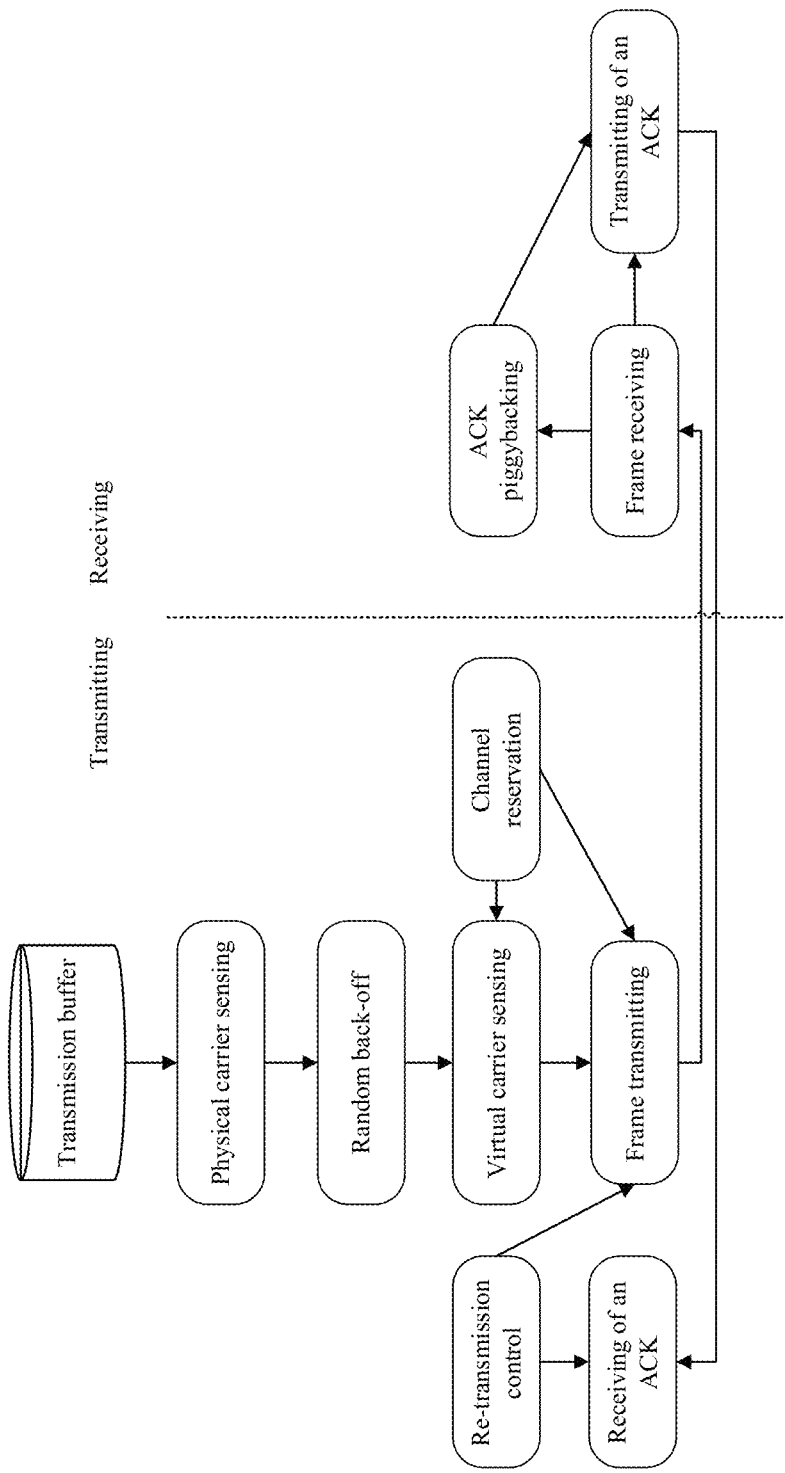
FIG. 13 shows a schematic diagram of a scheme of a medium access control layer according to an exemplary embodiment.

The CSMA protocol is a transmitting and receiving process based on random access control and retransmission control, for a purpose of channel-related scheduling. A scheme of a medium access control layer is as shown in FIG. 13, modules of which are illustrated below.

Physical carrier sensing refers to detecting whether a channel is busy or idle by sensing signal strength or in other manners.

Virtual carrier sensing refers to detecting whether a channel is busy or idle by transmitting an RTS frame and a CTS frame or in other manners.

Random back-off refers to waiting for a random back-off time period before contending for a channel, which is based on a quantity of contentions and a size of a contention window.

Channel reservation refers to reservation of a time period for occupying the channel for a current transmission, by using an RTS frame and CTS frame, in consideration of maximum transmission efficiency and fairness.

Retransmission control refers to a retransmission control based on a DATA-ACK mechanism.

ACK piggybacking refers to piggybacking an ACK with a data frame of the node for transmitting, in a case that the ACK is required to be transmitted, (where a destination address of the data frame is required to be the same as a destination address of the ACK).

Frame transmitting refers to a transmission control based on parameters of the modules.

Frame receiving refers to receiving of a frame and collecting of parameters required by the modules.

Hereinafter described is an apparatus for communication according to an embodiment of the present disclosure, the apparatus may be referred to the method described above.

Figure 14:
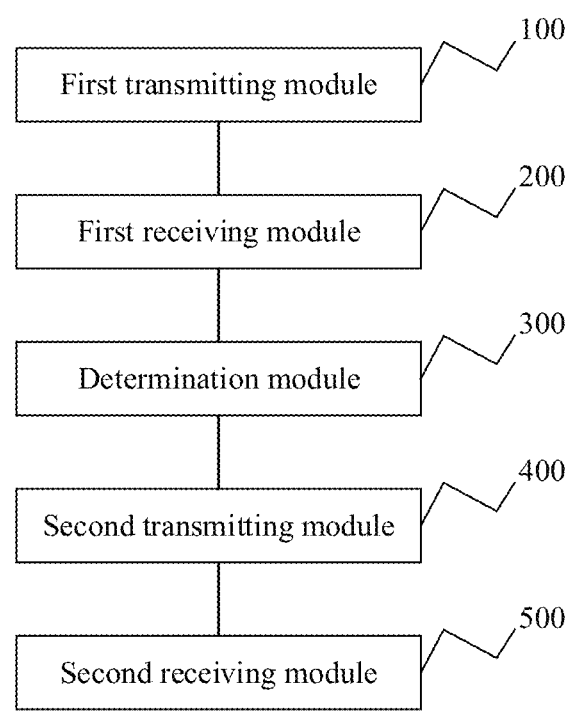
FIG. 14 shows a structural diagram of an apparatus for communication according to an exemplary embodiment.

Reference is made to FIG. 14, which is a structural diagram of an apparatus for communication according to an exemplary embodiment. As shown in FIG. 14, the apparatus includes a first transmitting module 100, a first receiving module 200, a determination module 300, a second transmitting module 400, and a second receiving module 500.

The first transmitting module 100 is configured to determine a first target frequency based on historical sensed information of a destination node, and transmit an RTS frame to the destination node at a first target frequency. The destination node obtains first sensed information of the source node based on the RTS frame, and determines a first optimal receiving frequency of the source node based on the first sensed information.

The first receiving module 200 is configured to receive a CTS frame transmitted by the destination node at the first optimal receiving frequency.

The determination module 300 is configured to obtain second sensed information of the destination node based on the CTS frame, and determine a second optimal receiving frequency of the destination node based on the second sensed information.

The second transmitting module 400 is configured to transmit a data frame to the destination node at the second optimal receiving frequency.

The second receiving module 500 is configured to receive an ACK frame transmitted by the destination node at the first optimal receiving frequency.

With the apparatus according to the embodiment of the present disclosure, the source node determines, based on the sensed information of the destination node, an optimal receiving frequency (i.e., the second receiving frequency) of the destination node. The destination node determines, based on the sensed information of the source node, an optimal receiving frequency (i.e., the first receiving frequency) of the source node. The sensed information includes sensed channel qualities of channels corresponding to frequencies. An optimal operating frequency may be determined based on the sensed information. In subsequent communication, the source node transmits frames to the destination node all at the second optimal receiving frequency, and the destination node transmits frames all at the first optimal receiving frequency. As can be seen, with the apparatus according to the embodiments of the present disclosure, a connection between the source node and the destination node can be established efficiently and reliably under a condition that the operating frequency of the source node and the operating frequency of the destination node are determined but unknown to each other. Thereby, network resources are controlled so that a utilization of the resources is improved while ensuring fairness.

In a preferred embodiment on the basis of the above embodiments, the first transmitting module 100 includes a first determination unit and a transmitting unit.

The first determination unit is configured to determine whether the historical sensed information of the destination node exists; determine the first target frequency based on the historical sensed information of the destination node, in a case that the historical sensed information of the destination node exists; and determine the first target frequency based on sensed information of a neighboring node within a single-hop network, in a case that the historical sensed information of the destination node does not exist.

The transmitting unit is configured to transmit the RTS frame to the destination node at the first target frequency. The destination node obtains the first sensed information of the source node based on the RTS frame, and determines a first optimal receiving frequency of the source node based on the first sensed information.

In a preferred embodiment on the basis of the above embodiment, the determination module 300 is specifically configured to: obtain second sensed information of the destination node based on the CTS frame; determine a channel quality of each channel corresponding to a frequency based on the second sensed information; and determine a frequency corresponding to a channel whose channel quality is highest and greater than a predetermined value as the second optimal receiving frequency of the destination node.

In a preferred embodiment on the basis of the above embodiment, the determination module 300 is specifically configured to: obtain second sensed information of the destination node based on the CTS frame; and determine the second optimal receiving frequency of the destination node based on the second sensed information and sensed information of a neighboring node within a single-hop network.

In a preferred embodiment on the basis of the above embodiment, the first receiving module 200 includes a receiving unit, a second determination unit, and a switching unit.

The receiving unit is configured to receive, through frequency hopping, a frequency-selective header transmitted by the destination node.

The second determination unit is configured to determine the first optimal receiving frequency through frequency-selective header synchronization.

The switching unit is configured to switch a receiving frequency to the first optimal receiving frequency, to receive the CTS frame transmitted by the destination node at the first optimal receiving frequency.

In a preferred embodiment on the basis of the above embodiment, the frequency-selective header includes a 2×N-hop frame structure for the first optimal receiving frequency, where N represents a quantity of candidate frequencies, and a single-hop frame structure includes a wash sequence. In addition, the receiving unit is specifically configured to: switch the receiving frequency among the candidate frequencies in a predetermined manner, to receive the frequency-selective header transmitted by the destination node; where for each of the candidate frequencies, the receiving frequency is switched to the candidate frequency and remained for a target time period, and the target time period is twice of a time period of a single hop in the frequency selection header.

The second determination unit is specifically configured to: calculate a correlation between a received wash sequence in a single-hop frame structure corresponding to a candidate frequency and a local wash sequence; and determine a candidate frequency corresponding to a correlation which is greater than a predetermined value as the first optimal receiving frequency.

In a preferred embodiment on the basis of the above embodiment, the communication apparatus further includes a sensing module.

The sensing module is configured to determine whether a channel is idle through physical carrier sensing and virtual carrier sensing, in a case that presence of data to be transmitted to the destination node is sensed; and contend for the channel through a random back-off, in a case that the channel is idle, and trigger the first transmitting module 100 after the channel is obtained.

Specific operations of the modules in the apparatus according to the above embodiments are described in detail in the embodiments of the method, and are not described in further detail here.

Figure 15:
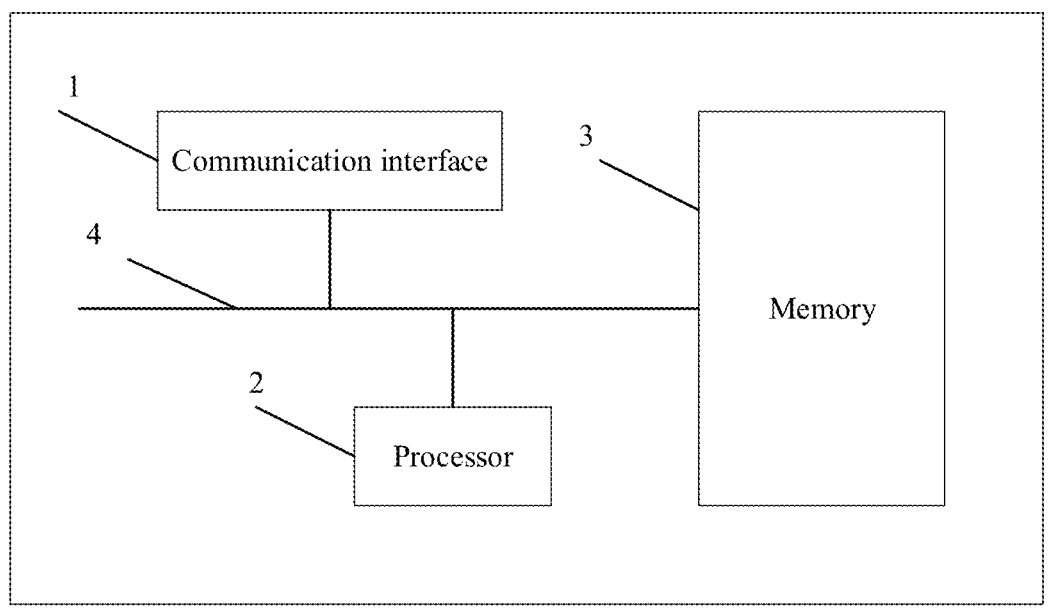
FIG. 15 shows a structural diagram of an electronic device according to an exemplary embodiment.

Based on a hardware implementation of the program modules described above, and in order to implement the method according to the embodiments of the present disclosure, an electronic device is further provided according to an embodiment of the present disclosure. FIG. 15 shows a structural diagram of an electronic device according to an exemplary embodiment. As shown in FIG. 15, the electronic device includes a communication interface 1 and a processor 2.

The communication interface 1 is configured to perform information interaction with a network device or other devices.

The processor 2 is connected to the communication interface 1 to perform information interaction with other devices, and is configured to perform, when executing a computer program, the method for communication according to one or more of the above technical solutions. The computer program is stored on a memory 3.

In practice, various components of the electronic device are coupled via a bus system 4. It can be understood that the bus system 4 enables connections and communications among the components. The bus system 4 includes a data bus, a power bus, a control bus and a status signal bus. However, various buses are marked collectively in FIG. 15 as the bus system 4 for clarity of description.

The memory 3 in the embodiments of the present disclosure is configured to store various types of data to support operations of the electronic device. Examples of the data include any computer program to be executed on the electronic device.

It is to be appreciated that the memory 3 may be a volatile memory or non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM). The magnetic surface memory may be a disk memory or magnetic tape memory. The volatile memory may be a random access memory (RANI), which is used as an external cache. Exemplarily, various RANI are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct ram-bus random access memory (DRRAM). The memory 3 described in the embodiments of the present disclosure includes, but is not limited to, these and any other suitable memories.

The methods disclosed in the embodiments of the present disclosure may be applied to the processor 2, or implemented by the processor 2. The processor 2 may be an integrated circuit chip having an ability of signal processing. During an implementation, the method may be performed by using an integrated logic circuit of hardware in the processor 2 or instructions in a software form in the processor 2. The processor 2 may be a general-purpose processor, a DSP, another programmable logic device, a discrete gate, a transistor logic device, a discrete hardware component, or the like. The method, process, and logical block diagrams disclosed in the embodiments of the present disclosure may be implemented or performed by the processor 2. The general-purpose processor may be a microprocessor or any conventional processor. The method disclosed in the embodiments of the present disclosure may be implemented directly by a hardware decoding processor, or implemented by a combination of a hardware module and a software module in a decoding processor. The software module may be disposed in a storage medium, and the storage medium is disposed in the memory 3. The processor 2 reads the program in the memory 3, and performs the method in cooperation with the hardware in the processor 2.

Processes of the method in the embodiments performed by the processor 2 when executing the program are not repeated here for ease of brevity.

In an exemplary embodiment, a storage medium, i.e., a computer storage medium, is further provided according to an embodiment of the present disclosure. The storage medium is specifically a computer-readable storage medium including, for example, a memory 3 storing a computer program. The computer program can be executed by the processor 2 to implement the method described above. The computer-readable storage medium may be a FRAM, a ROM, a PROM, an EPROM, an EEPROM, a Flash Memory, a magnetic surface memory, a compact disc, a CD-ROM, or other memories.

It is to be understood by those skilled in the art that all or some of the steps of the method embodiments may be performed by hardware in response to program instructions. The program may be stored in a computer-readable storage medium. The program, when executed, performs the method in the embodiments. The storage medium includes a movable storage device, an ROM, an RANI, a manganic disk, a compact disc, or any other medium which can store program codes.

The above-mentioned integrated unit, if embodied as a software functional module and sold or used as a stand-alone product, may be stored in a computer readable storage medium. Based on this, the technical solution of the embodiments of the present disclosure, or a part thereof that contributes to the conventional technology, may be embodied in a form of a software product. The software product is stored in a storage medium, and includes instructions for configuring an electronic device (which may be a personal computer, a server, or a network device, or the like) to perform all or a part of the method according to the embodiments of the present disclosure. The storage medium includes a movable storage device, an ROM, an RANI, a manganic disk, a compact disc, or any other medium that can store program codes.

Described above are only specific embodiments of the present disclosure, but the protection scope of the present disclosure is not limited thereto. Any changes or substitutions that can be easily envisaged by those skilled in the art within the technical scope disclosed in the present disclosure shall be covered within the scope of the present disclosure. Therefore, the protection scope of the present disclosure should conform to the scope defined by the claims.

The invention claimed is:

1. A method for communication, applied to a source node, wherein the method comprises:
   determining a first target frequency based on historical sensed information of a destination node, and transmitting a request-to-send (RTS) frame to the destination node at the first target frequency, wherein the destination node obtains first sensed information of the source node based on the RTS frame, and determines a first optimal receiving frequency of the source node based on the first sensed information;
   receiving a clear-to-send (CTS) frame transmitted by the destination node at the first optimal receiving frequency, obtaining second sensed information of the destination node based on the CTS frame, and determining a second optimal receiving frequency of the destination node based on the second sensed information; and
   transmitting a data frame to the destination node at the second optimal receiving frequency, and receiving an acknowledge (ACK) frame transmitted by the destination node at the first optimal receiving frequency,
   wherein the determining a first target frequency based on historical sensed information of a destination node comprises:
   determining whether the historical sensed information of the destination node exists;
   determining the first target frequency based on the historical sensed information of the destination node, in a case that the historical sensed information of the destination node exists; and determining the first target frequency based on sensed information of a neighboring node within a single-hop network, in a case that the historical sensed information of the destination node does not exist.

2. The method according to claim 1, wherein the determining a second optimal receiving frequency of the destination node based on the second sensed information comprises:

determining a channel quality of each channel corresponding to a frequency based on the second sensed information; and determining a frequency corresponding to a channel whose channel quality is highest and greater than a predetermined value as the second optimal receiving frequency of the destination node.

3. The method according to claim 1, wherein the determining a second optimal receiving frequency of the destination node based on the second sensed information comprises:

determining the second optimal receiving frequency of the destination node based on the second sensed information and sensed information of a neighboring node within a single-hop network.

4. The method according to claim 1, wherein the receiving a CTS frame transmitted by the destination node at the first optimal receiving frequency comprises:

receiving, through frequency hopping, a frequency-selective header transmitted by the destination node, wherein the frequency-selective header comprises a 2×N-hop frame structure for the first optimal receiving frequency, where N represents a quantity of candidate frequencies, and a single-hop frame structure comprises a wash sequence;

determining the first optimal receiving frequency through frequency-selective header synchronization; and switching a receiving frequency to the first optimal receiving frequency, to receive the CTS frame transmitted by the destination node at the first optimal receiving frequency.

5. The method according to claim 4, wherein
the receiving, through frequency hopping, a frequency-selective header transmitted by the destination node comprises:

switching the receiving frequency among the candidate frequencies in a predetermined manner, to receive the frequency-selective header transmitted by the destination node; wherein for each of the candidate frequencies, the receiving frequency is switched to the candidate frequency and remained for a target time period, and the target time period is twice of a time period of a single hop in the frequency-selective header; and the determining the first optimal receiving frequency through frequency-selective header synchronization comprises:

calculating a correlation between a received wash sequence in a single-hop frame structure corresponding to a candidate frequency and a local wash sequence; and determining a candidate frequency corresponding to a correlation which is greater than a predetermined value as the first optimal receiving frequency.

6. The method according to claim 1, wherein before the determining a first target frequency based on historical sensed information of a destination node, the method further comprises:

determining whether a channel is idle through physical carrier sensing and virtual carrier sensing, on determining of presence of data to be transmitted to the destination node; and contending for the channel through a random back-off in a case that the channel is idle, wherein the method proceeds to the determining a first target frequency based on historical sensed information of a destination node after the channel is obtained.

7. An electronic device, comprising:
a memory storing a computer program; and
a processor, wherein
the electronic device, when executes the computer program on the processor, is configured to:

determine a first target frequency based on historical sensed information of a destination node, and transmit a request-to-send (RTS) frame to the destination node at the first target frequency, wherein the destination node obtains first sensed information of the source node based on the RTS frame, and determines a first optimal receiving frequency of the source node based on the first sensed information;

receive a clear-to-send (CTS) frame transmitted by the destination node at the first optimal receiving frequency;

obtain second sensed information of the destination node based on the CTS frame, and determine a second optimal receiving frequency of the destination node based on the second sensed information;

transmit a data frame to the destination node at the second optimal receiving frequency; and receive an acknowledge (ACK) frame transmitted by the destination node at the first optimal receiving frequency, wherein the electronic device is further configured to:
determine whether the historical sensed information of the destination node exists;

determine the first target frequency based on the historical sensed information of the destination node, in a case that the historical sensed information of the destination node exists; and determine the first target frequency based on sensed information of a neighboring node within a single-hop network, in a case that the historical sensed information of the destination node does not exist.

8. The electronic device according to claim 7, further configured to:

determine a channel quality of each channel corresponding to a frequency based on the second sensed information; and determine a frequency corresponding to a channel whose channel quality is highest and greater than a predetermined value as the second optimal receiving frequency of the destination node.

9. The electronic device according to claim 7, further configured to:

determine the second optimal receiving frequency of the destination node based on the second sensed information and sensed information of a neighboring node within a single-hop network.

10. The electronic device according to claim 7, further configured to:

receive, through frequency hopping, a frequency-selective header transmitted by the destination node, wherein the frequency-selective header comprises a 2×N-hop frame structure for the first optimal receiving frequency, where N represents a quantity of candidate frequencies, and a single-hop frame structure comprises a wash sequence;

determine the first optimal receiving frequency through frequency-selective header synchronization; and switch a receiving frequency to the first optimal receiving frequency, to receive the CTS frame transmitted by the destination node at the first optimal receiving frequency.

11. The electronic device according to claim 10, wherein the electronic device is further configured to:

switch the receiving frequency among the candidate frequencies in a predetermined manner, to receive the frequency-selective header transmitted by the destination node, wherein for each of the candidate frequencies, the receiving frequency is switched to the candidate frequency and remained for a target time period, and the target time period is twice of a time period of a single hop in the frequency-selective header;

calculate a correlation between a received wash sequence in a single-hop frame structure corresponding to a candidate frequency and a local wash sequence; and determine a candidate frequency corresponding to a correlation which is greater than a predetermined value as the first optimal receiving frequency.

12. A non-transitory computer-readable storage medium, wherein the computer readable storage medium stores a computer program, and the computer program, when executed by a processor, is configured to:

determine a first target frequency based on historical sensed information of a destination node, and transmit a request-to-send (RTS) frame to the destination node at the first target frequency, wherein the destination node obtains first sensed information of the source node based on the RTS frame, and determines a first optimal receiving frequency of the source node based on the first sensed information;

receive a clear-to-send (CTS) frame transmitted by the destination node at the first optimal receiving frequency;

obtain second sensed information of the destination node based on the CTS frame, and determine a second optimal receiving frequency of the destination node based on the second sensed information;

transmit a data frame to the destination node at the second optimal receiving frequency; and receive an acknowledge (ACK) frame transmitted by the destination node at the first optimal receiving frequency, wherein the computer program, when executed by the processor, is further configured to:

determine whether the historical sensed information of the destination node exists;

determine the first target frequency based on the historical sensed information of the destination node, in a case that the historical sensed information of the destination node exists; and determine the first target frequency based on sensed information of a neighboring node within a single-hop network, in a case that the historical sensed information of the destination node does not exist.

13. The non-transitory computer-readable storage medium according to claim 12, wherein the computer program, when executed by the processor, is further configured to:

determine a channel quality of each channel corresponding to a frequency based on the second sensed information; and determine a frequency corresponding to a channel whose channel quality is highest and greater than a predetermined value as the second optimal receiving frequency of the destination node.

14. The non-transitory computer-readable storage medium according to claim 12, wherein the computer program, when executed by the processor, is further configured to:

determine the second optimal receiving frequency of the destination node based on the second sensed information and sensed information of a neighboring node within a single-hop network.

15. The non-transitory computer-readable storage medium according to claim 12, wherein the computer program, when executed by the processor, is further configured to:

receive, through frequency hopping, a frequency-selective header transmitted by the destination node, wherein the frequency-selective header comprises a 2×N-hop frame structure for the first optimal receiving frequency, where N represents a quantity of candidate frequencies, and a single-hop frame structure comprises a wash sequence;

determine the first optimal receiving frequency through frequency-selective header synchronization; and switch a receiving frequency to the first optimal receiving frequency, to receive the CTS frame transmitted by the destination node at the first optimal receiving frequency.

16. The non-transitory computer-readable storage medium according to claim 15, wherein the computer program, when executed by the processor, is further configured to:

switch the receiving frequency among the candidate frequencies in a predetermined manner, to receive the frequency-selective header transmitted by the destination node, wherein for each of the candidate frequencies, the receiving frequency is switched to the candidate frequency and remained for a target time period, and the target time period is twice of a time period of a single hop in the frequency-selective header;

calculate a correlation between a received wash sequence in a single-hop frame structure corresponding to a candidate frequency and a local wash sequence; and determine a candidate frequency corresponding to a correlation which is greater than a predetermined value as the first optimal receiving frequency.

* * * * *